(12) United States Patent
Hultquist

(10) Patent No.: US 7,963,506 B1
(45) Date of Patent: Jun. 21, 2011

(54) VEHICLE LEVELING APPARATUS

(76) Inventor: Linden Boyd Hultquist, Lancaster, CA (US)

( * ) Notice: Subject to any disclaimer, the term of this patent is extended or adjusted under 35 U.S.C. 154(b) by 331 days.

(21) Appl. No.: 11/900,529

(22) Filed: Sep. 12, 2007

(51) Int. Cl.
*B60S 9/02* (2006.01)

(52) U.S. Cl. .......................... 254/423; 254/418; 254/420

(58) Field of Classification Search .................. 254/423, 254/425, 418–422; 280/6.153, 763.1
See application file for complete search history.

(56) References Cited

U.S. PATENT DOCUMENTS

| | | | |
|---|---|---|---|
| 3,182,957 A * | 5/1965 | Dalton | 254/419 |
| 3,387,821 A * | 6/1968 | Saddler | 254/419 |
| 4,103,869 A * | 8/1978 | Mesny et al. | 254/425 |
| 4,245,855 A * | 1/1981 | Larson | 280/765.1 |
| 5,398,969 A * | 3/1995 | Wimmer | 280/765.1 |
| 6,237,953 B1 * | 5/2001 | Farmer | 280/763.1 |
| 6,311,954 B1 * | 11/2001 | Breslin et al. | 254/420 |
| 6,827,335 B1 * | 12/2004 | Medberry | 254/425 |
| 7,004,457 B2 * | 2/2006 | Jackson et al. | 254/423 |
| 7,261,304 B2 * | 8/2007 | Trudeau et al. | 280/6.153 |

* cited by examiner

*Primary Examiner* — Lee D Wilson
(74) *Attorney, Agent, or Firm* — Dennis W. Beech

(57) ABSTRACT

The present invention may be used for leveling a land vehicle. A frame lifting assembly may have a frame cross-member adjustable in length for attachment at each end to each side of a vehicle frame. A folding jack with a force element and a folding leg may be attached to the frame cross-member. The folding leg may have a leg member with a foot attached at a first end to a force rod of the force element. A support arm may be rotatably attached intermediate the first end and the second end of the leg member and may be rotatably attached adjacent a second end of the frame cross-member. A positioning rod may be rotatably attached at the first end of the leg member and rotatably attached to the frame member. The force rod may be movably attached to a fixed element of the force element and the fixed element may be attached to the frame cross-member. A power source may be operable to move the force rod relative to the fixed element to move the leg member between a generally horizontal position and a generally vertical position.

6 Claims, 4 Drawing Sheets

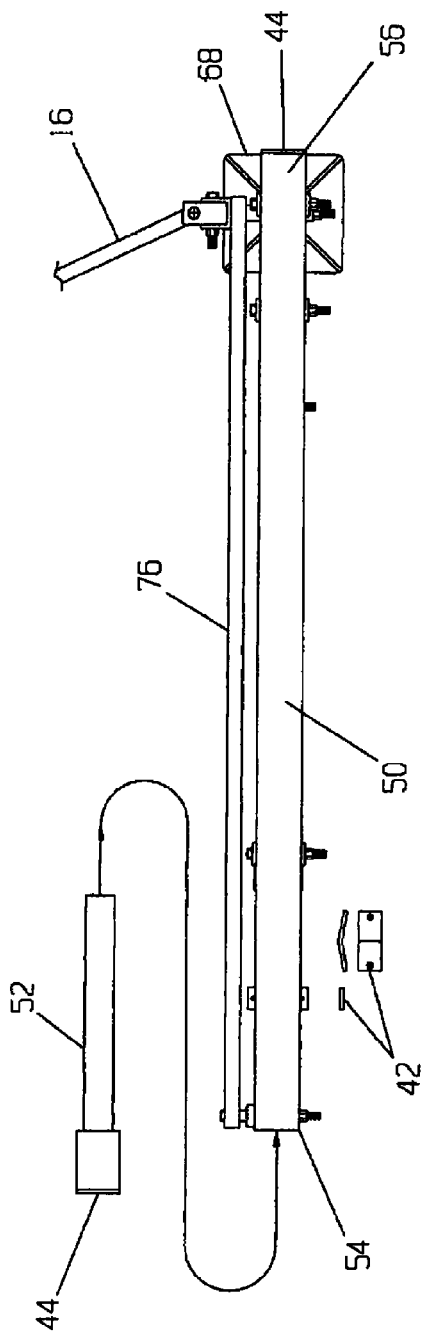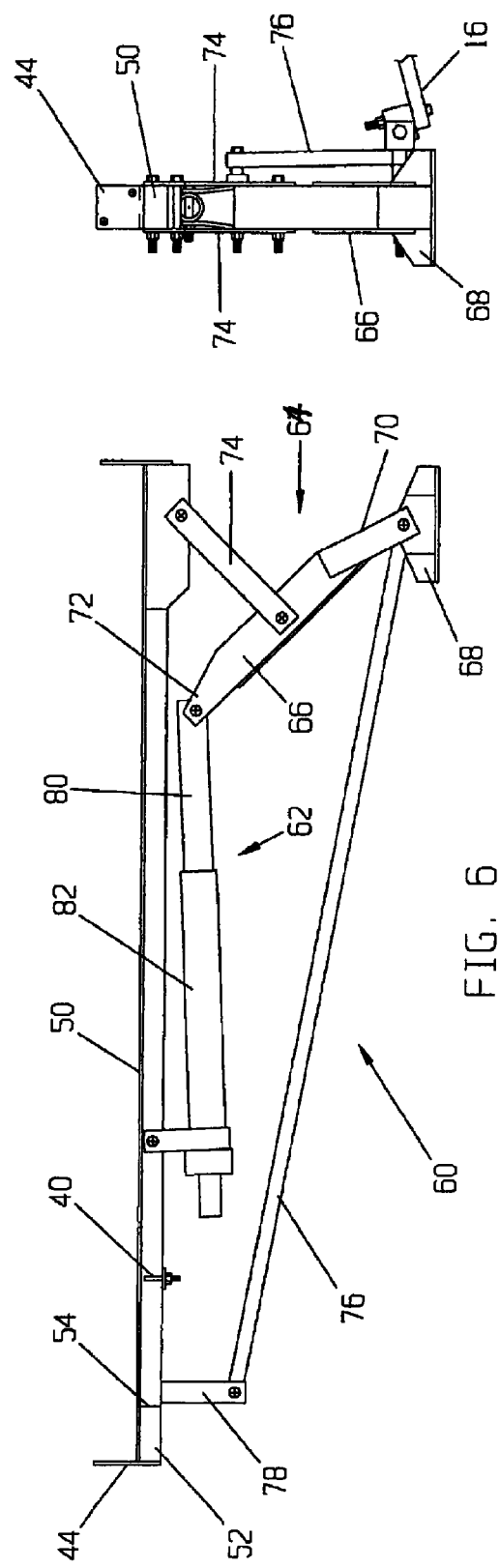

VEHICLE LEVELING APPARATUS

This application claims the benefit of U.S. Provisional Application 60/843,198, filed on Sep. 11, 2006.

BACKGROUND OF THE INVENTION

This invention relates to apparatus for leveling a land vehicle such as a trailer, camper or the like. The new leveling apparatus may be positioned between a pair of axles on a trailer or other multi-axle vehicle for effective attachment to a vehicle support structure to level and stabilize a vehicle.

Leveling of land vehicles and particularly recreation vehicles designed for camping and traveling may be a regular activity with use of such vehicles. Various elevating devices that may be vertically oriented on a vehicle such as a trailer or camper may use rotating screw devices that may be operated by hand. Hand operated hydraulic vertical devices may also be attached at corners of vehicles for use in raising or leveling—stabilizing a vehicle. Air operated, electronic or other hydraulic apparatus may be used to level a vehicle.

Most such leveling devices or apparatus may be attached or mounted adjacent the peripheral corners of a vehicle for purposes of raising or leveling a vehicle. Some jacks that may be used singularly to for example change a flat tire on an automobile may be inserted under one side, between front and rear axles to raise one side of a vehicle. Mounting of jacks or leveling devices in these locations may not be optimum as vehicle frames may be designed to be supported over the axles of the vehicles.

SUMMARY OF THE INVENTION

The present invention is directed to apparatus for leveling a land vehicle. A frame lifting assembly may have a frame cross-member adjustable in length for attachment at each end to each side of a vehicle frame. A folding jack with a force element and a folding leg may be attached to the frame cross-member. The folding leg may have a leg member with a foot attached at a first end to a force rod of the force element. A support arm may be rotatably attached intermediate the first end and the second end of the leg member and may be rotatably attached adjacent a second end of the frame cross-member. A positioning rod may be rotatably attached at the first end of the leg member and rotatably attached to the frame member. The force rod may be movably attached to a fixed element of the force element and the fixed element may be attached to the frame cross-member. A power source may be operable to move the force rod relative to the fixed element to move the leg member between a generally horizontal position and a generally vertical position.

These and other features, aspects and advantages of the present invention will become better understood with reference to the following drawings, description and claims.

BRIEF DESCRIPTION OF THE DRAWINGS

FIG. 5 illustrates a top plan of a frame lifting assembly according to an embodiment of the invention;

FIG. 6 illustrates a side elevation view of a frame lifting assembly according to an embodiment of the invention;

FIG. 7 illustrates a jack end view of a frame lifting assembly according to an embodiment of the invention;

DETAILED DESCRIPTION

Figure 1:
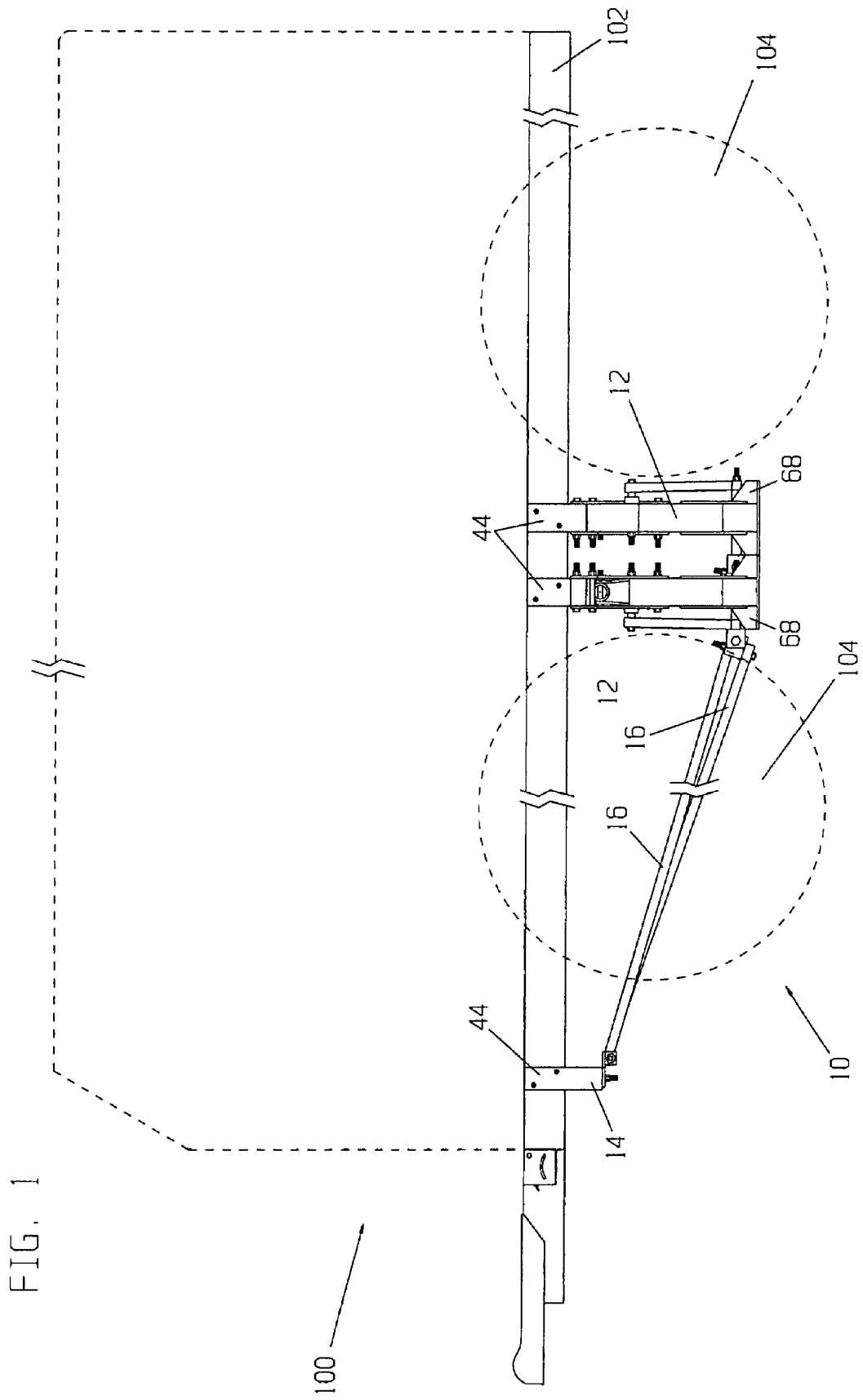
FIG. 1 illustrates a side elevation view of a vehicle leveling apparatus attached to a trailer according to an embodiment of the invention.
Figure 2:
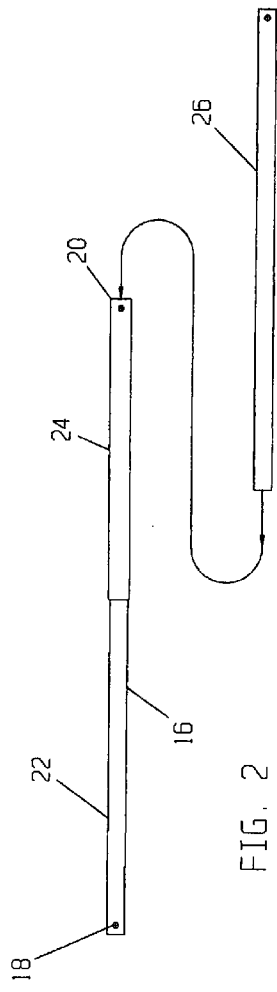
FIG. 2 illustrates a stabilizer shaft according to an embodiment of the invention.
Figure 3:
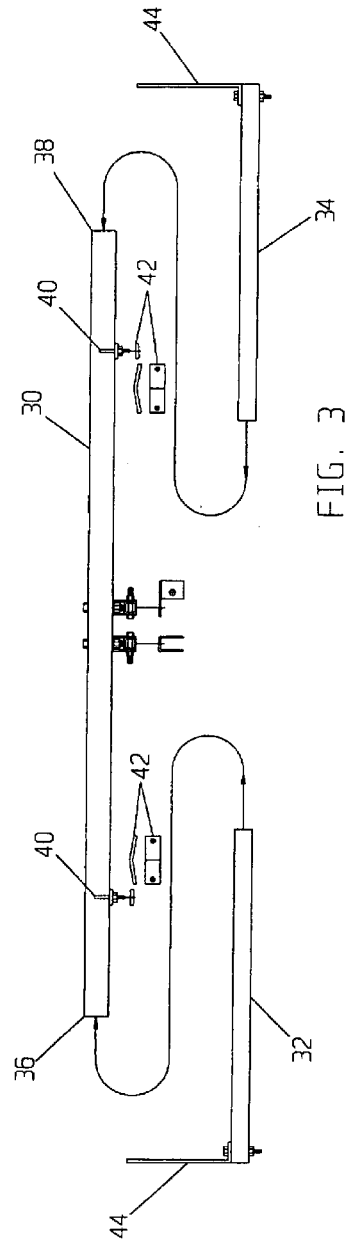
FIG. 3 illustrates a stabilizer cross bar according to an embodiment of the invention.

The following detailed description represents the best currently contemplated modes for carrying out the invention. The description is not to be taken in a limiting sense, but is made merely for the purpose of illustrating the general principles of the invention.

Referring to FIGS. 1 through 4, a vehicle leveling apparatus 10 may have two frame lifting assemblies 12 that may be attached to a vehicle 100 frame 102 between a pair of axles 104 of the vehicle 100, for example, a multiple axle trailer. There may also be a stabilizer cross-member 14 that may be adjustable in length for attachment to each side of frame 102. There may be a link member 16 or rod attached at a first end 18 adjacent a foot 68 of each frame lift assembly 12 and at a second end 20 to the stabilizer cross-member 14.

The link members 16 may be slidably adjustable in length to accommodate variable distances between the attachment to a frame lifting assembly 12 and the stabilizer cross-member 14. The adjustability may also allow expansion and contraction when a jack 60 may be raised and lowered. The link members 16 may have a first hollow rod 22 slidably disposed in a second hollow rod 24. The rods 22, 24 may be circular, rectangular or other suitable cross section shape. The link members 16 may also be formed using a third hollow rod 26 slideably disposed in the second hollow rod 24 opposite the first hollow rod 22.

The stabilizer cross-member 14 may have a first hollow rod 30 with a second rod 32 slidably inserted in a first end 36 and a third rod 34 slidably inserted in a second end 38. This may allow adjustment of the stabilizer cross-member 14 to accommodate variable width vehicle frame 102 attachment locations. The rods 30, 32, 34 may be circular, rectangular or other suitable cross section shape. Example rods may also include U-shape channels and slidable movement may be limited by bolts 40. Flat bars 42 may be attached to U-shape channels to retain slidable rods. A bracket 44 may be attached at one end of each rod 32, 34 for use in attachment to a frame 102.

Referring to FIGS. 5 through 7, a frame lifting assembly 12 may have a frame cross-member 50 that may have a rod insert 52 that may be slidably disposed in a first end 54 of the frame cross-member 50. The frame cross-member 50 and rod insert 52 may have cross section shapes as disclosed for other member and rod elements; however, a hollow rectangular shape may be preferred. The rod insert 52 may have a bracket 44 attached at one end for attachment to a frame 102.

A folding jack 60 that may be moved from a generally horizontal orientation to a generally vertical orientation may be attached to a second end 56 of frame cross-member 50. The folding jack 60 may have a force element 82 and a folding leg 64. The folding leg 64 may have an elongated leg member 66 with a foot 68 attached at a first end 70 and with a second end 72 attached to a force rod 80 of the force element 82. A support arm 74 may be rotatably attached at a first end to the leg member 66 intermediate the ends 70, 72. The support arm 74 may be rotatably attached at a second end to the second end 56 of the frame cross-member 50. A positioning rod 76 may be rotatably attached at a first end to the first end 70 of the leg member 66 and at a second end to the frame cross-member 50. The positioning rod 76 at the second end may be attached to an extension arm 78 attached adjacent the first end 54 of the frame cross-member 50.

The force element 62 may be a motor drive screw device, a hydraulic piston device or other force transfer device that may generally have a movable force rod 80 and a fixed element 82. The fixed element 82 may be attached to the frame cross-member 50 disposed for attachment of the force rod 80 to the second end 72 of the leg member 66. In operation, when power may be applied to the fixed element 82 the force rod 80 may be extended or retracted thereby causing the leg member 66 to move between a generally horizontal position to a generally vertical position.

Figure 4:
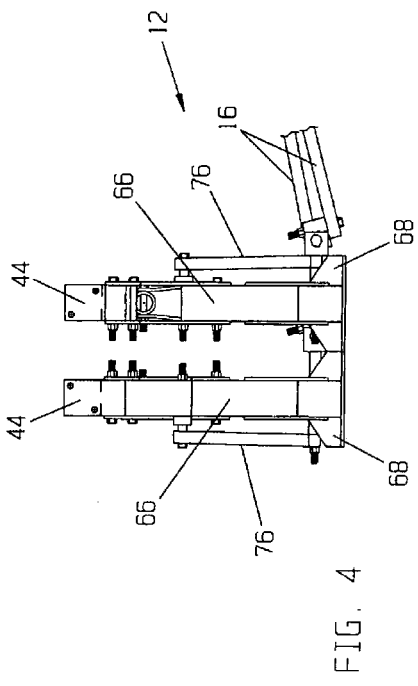
FIG. 4 illustrates an end view of two frame lifting assemblies positioned for attachment according to an embodiment of the invention.

Referring to FIGS. 1 and 4, it can be understood that two frame lifting assemblies 12 may be attached to a vehicle frame 102 with the folding jack elements spaced apart to be positioned adjacent opposite sides of a vehicle frame 102. The folding jacks 60 may then be operated to level a vehicle, such as a trailer and to stabilize a trailer while it may be used for camping or other recreational activity. With a structure that may span the distance between the two sides of a vehicle frame 102 and that may be placed between a vehicle's axles 104, the vehicle leveling apparatus 10 may support a vehicle 100 without significant distortion of the frame 102 as may be caused by corner mounted jacks or supports.

Figure 9:
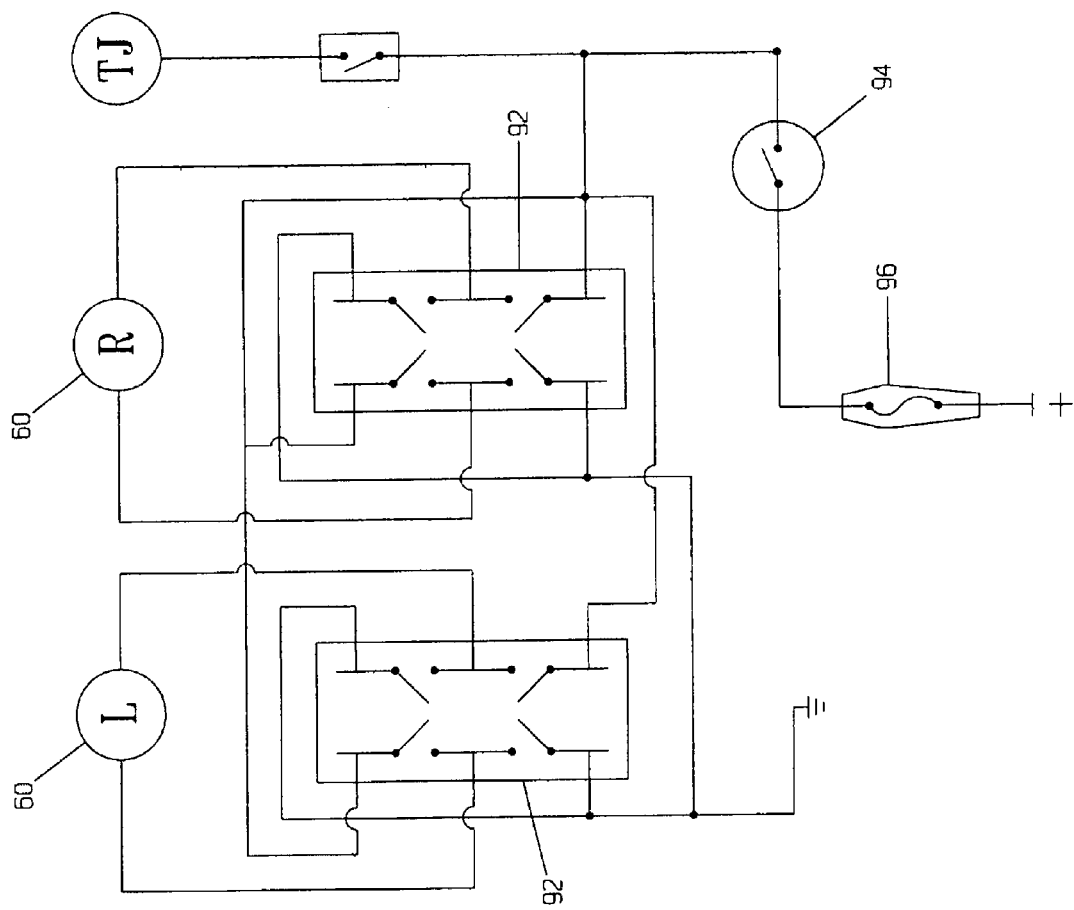
FIG. 9 illustrates a schematic diagram of a switch control circuit according to an embodiment of the invention.
Figure 8:
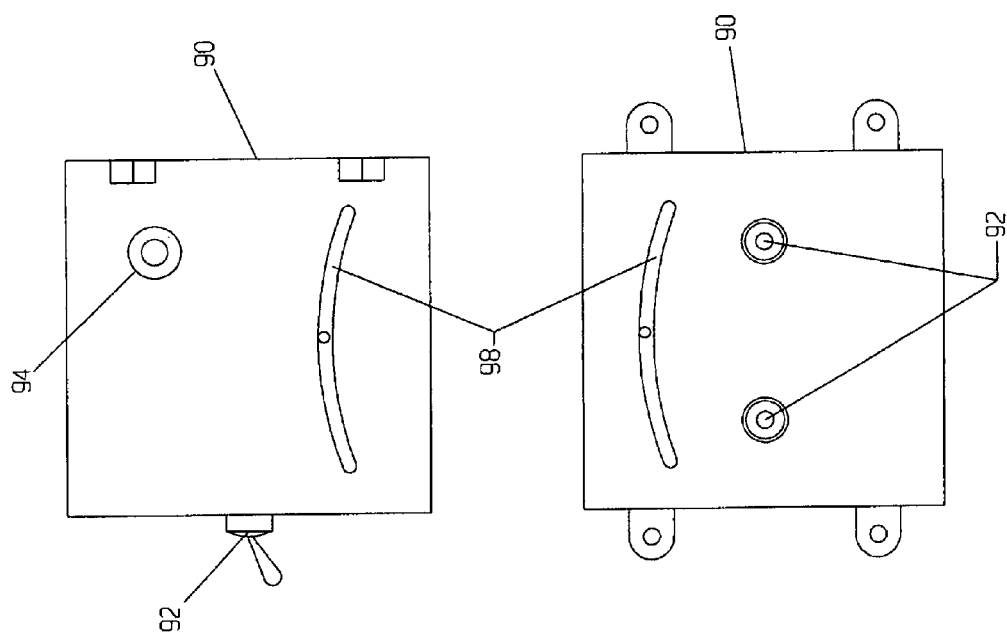
FIG. 8 illustrates a control box according to an embodiment of the invention.

Referring to FIGS. 8 and 9, if the folding jack 60 may be powered by an electric motor to drive a rotatable screw shaft, actuate a hydraulic system or like device, there may be an electronic control box 90 in communication with the electric motor. The electronic control box 90 may have two double pole double throw switches 92 electrically connected for each switch 92 to actuate one of the folding jack 60 electric motors. There may be a key lock 94 to control application of electric power to the switches 92. There may also be a fuse 96 to protect the circuitry and electric motor. As is understood in the art the switches 92 may be connected in various configurations. An automatic leveling control apparatus may also be connected to control power to each switch 92. A leveling bubble device 98 may be used visually by an operator or with an automatic leveling control apparatus.

While the invention has been particularly shown and described with respect to the illustrated embodiments thereof, it will be understood by those skilled in the art that the foregoing and other changes in form and details may be made therein without departing from the spirit and scope of the invention.

I claim:

1. An apparatus for leveling a land vehicle comprising:
   a frame lifting assembly having a frame cross-member adjustable in length for attachment at each end to each side of a vehicle frame;
   a folding jack with a force element attached to said frame cross-member with said force element longitudinal axis positioned generally parallel to the longitudinal axis of said frame member and a folding leg attached to said frame cross-member;
   said folding leg having a leg member with a foot attached at a first end and attached at a second end to a force rod of said force element;
   a support arm rotatably attached intermediate said first end and said second end of said leg member and rotatably attached adjacent a second end of said frame cross-member;
   a positioning rod rotatably attached at said first end of said leg member and rotatably attached to said frame cross-member;
   said force rod movably attached to a fixed element of said force element and said fixed element attached to said frame cross-member; and
   a power source operable to move said force rod relative to said fixed element to move said leg member between a generally horizontal position and a generally vertical position.

2. The apparatus as in claim 1 wherein a first frame lifting assembly and a second frame lifting assembly are attached to said land vehicle frame with each frame lifting assembly disposed adjacent and said first frame lifting assembly at a first end thereof is adjacent said second frame lifting assembly at said second end thereof.

3. The apparatus as in claim 2 wherein said first frame assembly and said second frame assembly are disposed between a pair of axles of a vehicle.

4. The apparatus as in claim 2 further comprising:
   a stabilizer cross-member adjustable in length for attachment at each end to said each side of said vehicle frame; and
   a link member rotatably attached at a first end adjacent said first end of said leg member and said link member rotatably attached at a second end to said stabilizer cross-member.

5. The apparatus as in claim 2 wherein said power source comprising:
   an electric motor linked to a rotatable shaft operable to move each of said force rods longitudinally;
   an electronic control box in communication with each of said electric motor and said electronic control box has two double pole double throw switches electrically connected to activate each of said electric motors separately; and
   a key lock to control power to each of said switches.

6. The apparatus as in claim 5 wherein a leveling bubble device is mounted with said electronic control box.

* * * * *